(12) United States Patent
Oomen et al.

(10) Patent No.: US 8,317,379 B2
(45) Date of Patent: Nov. 27, 2012

(54) CAR LIGHTING UNIT FOR GENERATING A BEAM OF LIGHT AND A HOLOGRAPHIC 3D IMAGE

(75) Inventors: Emmanuel Wilhelmus Johannes Leonardus Oomen, Eindhoven (NL); Lingli Wang, Bad Kreuznach (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 318 days.

(21) Appl. No.: 12/864,531

(22) PCT Filed: Jan. 30, 2009

(86) PCT No.: PCT/IB2009/050375
§ 371 (c)(1),
(2), (4) Date: Jul. 26, 2010

(87) PCT Pub. No.: WO2009/095883
PCT Pub. Date: Aug. 6, 2009

(65) Prior Publication Data
US 2010/0302794 A1 Dec. 2, 2010

(30) Foreign Application Priority Data
Feb. 1, 2008 (EP) .................................. 08150959

(51) Int. Cl.
*F21V 7/00* (2006.01)
*B60Q 1/56* (2006.01)

(52) U.S. Cl. ........ 362/518; 362/532; 362/541; 362/542; 362/516; 362/520; 362/498; 362/499; 359/15

(58) Field of Classification Search .............. 362/36–37, 362/459, 487, 498–499, 509, 514, 516–522, 362/538–542; 359/9, 13, 15, 19, 23, 28, 359/32, 35, 901
See application file for complete search history.

(56) References Cited

U.S. PATENT DOCUMENTS

| | | | |
|---|---|---|---|
| 4,722,037 A | 1/1988 | Davis |
| 4,916,593 A | 4/1990 | Moss et al. |
| 5,347,435 A | 9/1994 | Smith et al. |
| 5,497,251 A | 3/1996 | Wreede et al. |
| 5,571,277 A | 11/1996 | Allred et al. |
| 5,724,161 A | 3/1998 | Smith et al. |
| 5,822,088 A | 10/1998 | Danno et al. |
| 6,845,580 B2 | 1/2005 | Noble |
| 2005/0068783 A1 | 3/2005 | Egashira et al. |

FOREIGN PATENT DOCUMENTS

| EP | 0870655 A1 | 10/1998 |
|---|---|---|
| JP | 10172310 A | 6/1998 |

*Primary Examiner* — Anne Hines
*Assistant Examiner* — Jose M Diaz
(74) *Attorney, Agent, or Firm* — Mark L. Beloborodov (57) ABSTRACT

The invention provides a car lighting unit comprising a reflector and a light source arranged to generate light. The reflector circumferentially surrounds the light source and has a reflector opening. The reflector is arranged to reflect at least part of the light from the light source through the reflector opening. The car lighting unit further comprises a source-related 3D hologram and a source-unrelated 3D hologram. The car lighting unit is 5 constructed to generate a beam of light and a source-related holographic 3D image, using light from the light source, during operation of the lighting unit, and a source-unrelated 3D holographic image when the lighting unit is not in operation.

12 Claims, 5 Drawing Sheets

CAR LIGHTING UNIT FOR GENERATING A BEAM OF LIGHT AND A HOLOGRAPHIC 3D IMAGE

FIELD OF THE INVENTION

The present invention relates to a car lighting unit comprising a reflector and a light source, the car lighting unit further comprising a hologram.

BACKGROUND OF THE INVENTION

Use of holograms in lighting applications is known in the art. For instance, U.S. Pat. No. 5,497,251 discloses a hologram structure for use in a holographic center high-mounted stoplight system for a vehicle. The hologram structure includes an illumination source for providing a reconstruction beam, a first array of non-overlapping hologram cells and non-hologram cells, and a second array of non-overlapping hologram cells and non-hologram cells. Each hologram cell of the first array produces a specular image that is viewable in a first predetermined angular field pursuant to diffraction of a portion of the reconstruction beam, and each hologram cell of the second array produces a diffuse image that is viewable in a second predetermined angular field pursuant to diffraction of a portion of the reconstruction beam. The specular images and diffuse images produced by the first and second holograms form stoplight illumination. In this way, a stoplight should be provided that has an output with an appearance that is similar to the lenticulated output of a conventional headlight.

U.S. Pat. No. 4,722,037 discloses an optical assembly for providing illumination comprising (a) a first artificial light source providing light at a first wavelength, (b) a second artificial light source providing light at a second wavelength different from said first wavelength, and (c) a holographic optical element adapted to diffract light of said first and second wavelengths in different beam patterns, and positioned in such a way that light from said first and second light sources is diffracted in said different beam patterns to provide illumination of two different regions in space. The optical assemblies according to U.S. Pat. No. 4,722,037 should provide an improved efficiency and reduced glare by producing multiple beam patterns, using a plurality of light sources of different spectral characteristics, and a holographic optical element adapted to diffract light from the two light sources into different beam patterns. The optical assemblies according to U.S. Pat. No. 4,722,037 should be useful as automobile headlights to produce high or low-beam illumination of the roadway, depending on which light source is turned on.

U.S. Pat. No. 5,571,277 discloses an automotive signal lamp comprising a first light providing a source of illumination, a tinted lens receiving the illumination by the first light source on a first side of the lens, the lens tinting the illumination given by the first light source to a first desired frequency, a transmissive hologram adjacent the lens for providing a first image only when the first light source is actuated, the transmissive hologram being activated by light at the first desired frequency, and a reflective hologram adjacent the transmissive hologram for providing an image differing from the first image, the second image being visible only when the first light source is not actuated and when the lens is illuminated by a second light source on a side of the lens generally opposite the first light source.

OBJECT AND SUMMARY OF THE INVENTION

These prior-art lamps have one or more drawbacks in that they are not suitable for generating a beam of light in accordance with the prescribed specifications, which beam is used for illumination or signaling (i.e. light signaling function), while simultaneously also for generating a holographic 3D image, which can be used, for instance, to provide information. Another drawback of the prior-art lamps may be, for instance, the inability to generate a holographic image when the lamp is not switched on (i.e. is not operating).

It is an object of the invention to provide an alternative car lighting unit, which preferably further obviates one or more of the above-mentioned drawbacks.

According to a first aspect of the invention, a car lighting unit is provided, comprising a reflector and a light source arranged to generate light, wherein the reflector circumferentially surrounds the light source and has a reflector opening, the reflector being arranged to reflect at least part of the light from the light source through the reflector opening, the car lighting unit further comprising a source-unrelated 3D hologram arranged to receive daylight and generate a source-unrelated holographic 3D image by daylight, wherein the source-unrelated 3D hologram is a reflective 3D hologram comprised by the reflector, the reflector further comprising an optical opening arranged to guide away, as hologram feed light, at least part of the light from the light source, the car lighting unit further comprising a source-related 3D hologram, external from the reflector and arranged to receive the hologram feed light via the optical opening and generate a source-related holographic 3D image, the car lighting unit being constructed to generate a beam of light and the source-related holographic 3D image by light from the light source.

The light source that is arranged and used to generate the beam is herein also used to generate the source-related 3D holographic image; there are no separate light sources for generating the beam and the 3D holographic image, respectively. The 3D hologram using part of the source light (i.e. at least part of the hologram feed light) is therefore indicated as "source-related 3D hologram"; likewise, the 3D holographic image generated by the 3D hologram when receiving at least part of the source light (i.e. at least part of the hologram feed light) is indicated as "source-related 3D holographic image".

Advantageously, part of the light from the light source illuminates the source-related hologram so as to generate a virtual or a real holographic 3D image (e.g. logo, car brand) (source-related holographic 3D image); the features of the source-related hologram and the source-related holographic image per se are not intended for signaling, although they are of course part of the signal. Another part of the light from the light source will be reflected by a reflector for signaling. In this way, one lamp (lighting unit) can be applied to simultaneously generate the source-related holographic 3D image and the required beam of light, which beam of light may fully comply with the specification for its specific signaling purpose. The lighting unit is preferably constructed to provide a signal function (signaling) instead of an illumination function (illumination). Hence, the car lighting unit is preferably designed to provide a light-signaling function (signaling lighting devices). Characteristic examples of such lighting units are stop lamps, direction indicators, rear lamps, etc.

The source-unrelated hologram is herein arranged to receive daylight and reflect/refract the daylight in such a way that the 3D hologram generates the 3D holographic image. The 3D hologram using daylight is therefore indicated as "source-unrelated 3D hologram" and can also be indicated as "daylight hologram"; likewise, the 3D holographic image generated by the 3D hologram when receiving daylight (i.e. at least part of the hologram feed light) is indicated as "source-unrelated 3D holographic image". The source-unrelated 3D holographic image may be created when the light source is switched on or switched off. In the latter state, the 3D holographic image may more easily be visible than in the former state. The reflective source-unrelated hologram is especially arranged to provide the source-unrelated 3D hologram when the light source is switched off. In this way, a holographic image can be created, even when the light source is switched off. The 3D holographic image created by the source-related hologram may have the same contents as, or different contents than the source-unrelated 3D holographic image created by the source-unrelated 3D hologram.

Likewise, the source-unrelated hologram may advantageously be able to generate a virtual or a real holographic 3D image (e.g. logo, car brand) (source-unrelated holographic 3D image) when daylight impinges on the source-unrelated 3D hologram; in one embodiment, the features of the source-unrelated hologram and source-unrelated holographic image per se are not intended for signaling. When the car lighting unit is not switched on, i.e. the light source is not switched on, the source-unrelated holographic image may still be visible, because it is arranged to generate the source-unrelated 3D holographic image by the impinging daylight. Hence, the source-unrelated hologram is especially a reflective 3D hologram. The source-unrelated 3D hologram is comprised by the reflector, whereas the source-related 3D hologram is external from the reflector.

The reflective 3D hologram using daylight is therefore indicated as source-unrelated hologram; likewise, the 3D holographic image generated by the reflective 3D hologram when receiving daylight is indicated as source-unrelated 3D holographic image.

For automotive applications, signaling lighting is usually indicated in candela (cd) (luminous intensity), whereas for lighting this is usually indicated in lux (lx) (illuminance) and sometimes in candela (e.g. the new Front Fog application), as known to the person skilled in the art.

The reflector and, in one embodiment, also an optional (transmissive) optical element (see below) are arranged to shape the beam of the lighting unit, i.e. the reflector and the optionally (transmissive) optical element are beam-shaping elements. In contrast, the source-related and/or source-unrelated holograms are substantially not arranged to shape the beam, but are essentially arranged to provide the source-related 3D holographic image in addition to the beam of light, the latter, and more preferably the whole beam including the holographic 3D image, preferably fulfilling the required specifications for the intended use of the lighting unit, such as stop light, fog light, etc. (see also below), and/or to provide the source-unrelated holographic 3D image when the lighting unit is not switched on, respectively. Hence, the lighting unit according to a preferred embodiment of the invention has the functionality of providing, at the same time, a beam in accordance with the required specifications, such as for stop lamps or direction indicators, etc., and a holographic image (the source-related 3D holographic image), which is additional to the beam. More preferably, the lighting unit according to a preferred embodiment of the invention has the functionality of providing, at the same time, a beam in accordance with the required specifications, such as for stop lamps or direction indicators, etc., and a holographic image, which is additional to the beam, said lighting unit being constructed to provide the beam including the 3D holographic image (the 3D holographic image is preferably within the prescribed beam) in accordance with the prescribed specifications (especially in accordance with one or more of the regulations mentioned therein). Furthermore, the lighting unit according to a preferred embodiment of the invention has the functionality of providing a holographic 3D image (i.e. the source-unrelated 3D holographic image), even when the source of light is not switched on, due to the influence of daylight on the source-unrelated 3D hologram, thereby generating the source-unrelated 3D holographic image.

In a specific embodiment, the reflector opening has a reflector opening area (which may optionally comprise an optical element), the source-unrelated 3D hologram has a hologram surface area, and the ratio between the reflector opening area and the hologram surface area is $\geq 1$, preferably $\geq 2$, more preferably $\geq 4$, such as in the range of about 1 to 10, preferably in the range of about 2 to 10, more preferably in the range of about 4 to 10. Especially under these conditions, the lighting unit is suitable for generating the specified beam of light, simultaneously without being substantially influenced by the presence of the source-unrelated hologram (which is comprised by the reflector).

During use of the lighting unit, the ratio of the luminous intensity related to the source-related holographic 3D image relative to the total luminous intensity (i.e. luminous intensity in the beam including the 3D holographic image) is preferably in the range of about 0.002 to 0.3, more preferably in the range of about 0.01 to 0.1.

The car lighting unit may be selected from the group consisting of rear direction indicator lamps, front direction indicator lamps, side direction indicator lamps (side turn signal lamps), stop lamps, front position (side) lamps, rear position (side) lamps (tail lamps), end-outline marker lamps, rear fog lamps (fog tail lamps), CHMSL (Center High Mounted Stop Lamps), HMSL (High Mounted Stop Lamps (rear turn lamps)), DRL (Daytime Running Lights), reversing lamps (backup lamps) and parking lamps. The light source may comprise one or more light sources selected from the group consisting of LEDs (light-emitting devices), OLEDs (including, for instance, polyLEDs and single molecule OLEDs), filament light sources, such as incandescent lamps and halogen lamps, and gas-discharge light sources, such as high-intensity discharge lamps. The light source preferably comprises one or more light sources selected from the group consisting of LEDs (such as, for instance, top-LEDs and/or side-LEDs) and incandescent lamps.

In a preferred embodiment, the car lighting unit according to the invention is constructed to generate the source-related holographic 3D image within a distance in the range of about 0 to 5 m from the reflector opening. The distance is preferably in the range of about 0 to 2 m, more preferably in the range of about 0 to 0.5 m, more preferably in the range of about 0 to 0.1 m. In this way, the source-related holographic 3D image is substantially not blended by the beam of light from the lighting unit and is visible for an observer, such as another road user. Furthermore, in this way, other users of the road will see both the lighting unit (i.e. especially its signal) and the holographic image at the same time and substantially at the same position.

Likewise, a preferred embodiment of the car lighting unit according to the invention is constructed to generate the source-unrelated holographic 3D image within a distance in the range of about 0 to 5 m from the reflector opening. The distance is preferably in the range of about 0 to 2 m, more preferably in the range of about 0 to 0.5 m, more preferably in the range of about 0 to 0.1 m.

In a specific embodiment, the source-related 3D hologram is a transmissive hologram. In another specific embodiment, the source-related 3D hologram is a reflective hologram. The source-related 3D holographic image may contain information, such as one or more symbols or one or more letters, words, abbreviations, etc. or combinations thereof, or graphic representations, patterns or objects. Also combinations of such contents may be used. For instance, the image may be a 3D image of the logo of the brand of the car and/or the type of the car, but it may also represent information such as arrows (for instance, for a lighting unit for use as a direction indicator) or words such as brand names or warning information, etc. Hence, the invention therefore provides the possibility of adding information, etc. to beams of lighting units ("lamps") of cars (or other vehicles).

Likewise, the source-unrelated 3D holographic image may contain information, such as one or more symbols or one or more letters, words, abbreviations, etc. or combinations thereof, or graphic representations, patterns or objects. Also combinations of such contents may be used. For instance, the image may be a 3D image of the logo of the brand of the car and/or the type of the car, but it may also represent information such as arrows (for instance, for a lighting unit for use as a direction indicator) or words such as brand names or warning information, etc. Hence, the invention therefore provides the possibility of adding information, etc. to lighting units ("lamps") of cars (or other vehicles), even when switched off.

The reflector has a reflector surface which is arranged to reflect at least part of the light generated by the light source. In principle, lighting units not having a reflector can be applied and are considered to be incorporated herein as well, but the lighting unit according to the invention preferably comprises such a reflector. The presence of a reflector allows beam-shaping. Furthermore, the invention is also applicable to light guide collimators or other types of collimating optics. Such optics can be used to collimate the light to a reflector opening (for instance, a fiber tip).

In an embodiment, the car lighting unit further comprises an optical unit with an optical chamber, the optical chamber being arranged to receive the hologram feed light via the optical opening, wherein the optical chamber further comprises a reflector arranged to reflect at least part of the hologram feed light in the direction of the source-related 3D hologram.

In an embodiment, the optical opening comprises a waveguide arranged to guide the hologram feed light in the direction of the source-related 3D hologram. Such a waveguide may be used to feed light from the light source (i.e. the hologram feed light) to the source-related 3D hologram. This light may be fed directly to the source-related 3D hologram, but also further optics, such as reflectors, etc. may be arranged between an exit (or "tip" or "downstream side" of the waveguide) and the source-related 3D hologram.

In another embodiment, the car lighting unit further comprises an optical unit with an optical chamber, the optical chamber being arranged to receive the hologram feed light via the optical opening, wherein the optical chamber further comprises a chamber opening, the source-related 3D hologram is a transmissive hologram, and the chamber opening comprises the source-related 3D hologram. In general, the chamber opening (or exit window) may consist of the source-related 3D hologram and, optionally, further optics, layers or windows.

The optical chambers mentioned hereinbefore may have reflective walls, in order to facilitate transport of the light from the light source to the source-related 3D hologram.

In a further embodiment, the source-unrelated 3D hologram is arranged on the reflector surface. In another embodiment, the reflector opening comprises an optical element, and the source-unrelated 3D hologram may be arranged on the preferably transmissive optical element.

In an embodiment, the source-unrelated 3D hologram is arranged on at least part of the chamber wall. In this embodiment, the hologram is reflective. In another embodiment, the optical chamber opening comprises an optical element, preferably a transmissive optical element, and the source-unrelated 3D hologram may be arranged on the preferably transmissive optical element.

In a specific embodiment, the source-unrelated 3D hologram is a dynamic hologram. This advantageously provides the possibility of providing information, such as commercial-like information about the brand and/or type, etc. (see also above), which information may change with time. For instance, the source-unrelated holographic image may be projected at a (predetermined) frequency, or different information may be provided alternatingly. The contents of the 3D holographic image may be varied by the driver, crew or a passenger, but may optionally also be a function of sensor signals, such as the distance between the car having such a lighting unit and another car behind or in front of the car having said lighting unit, which sensor signals are provided by one or more distance sensors.

In a specific embodiment, the source-related 3D hologram is a dynamic hologram. Again, this advantageously provides the possibility of providing information, such as commercial-like information about the brand and/or type, etc. (see also above), which information may change with time. Likewise, the holographic image may be projected at a (predetermined) frequency, or different information may be provided alternatingly. The contents of the 3D holographic image may be varied by the driver, crew or a passenger, but may optionally also be a function of sensor signals, such as the distance between the car having such a lighting unit and another car behind or in front of the car having said lighting unit, which sensor signals are provided by one or more distance sensors.

Hence, in an embodiment, the source-unrelated 3D hologram and/or the source-related hologram is a dynamic hologram.

In an embodiment, the car lighting unit is constructed to generate the source-related holographic image within the beam of light, i.e. the light source, reflector and source-related hologram are arranged to generate a beam of light within specific angles (in accordance with regulations for the specific lighting unit) and the source-related holographic image is also found within these angles. In an alternative embodiment, the source-related holographic image may also be generated outside, or at least partially outside the beam of light.

For instance, the source-related holographic image may be visible within the specifications for the beam shape (i.e. beam specs) belonging to the beam of the lighting unit. For instance, the beam shape of a stop light is regulated in accordance with SAE J 586 for native America, in ECE regulation 7 for Europe and in JSD 5500 for Japan. The source-related holographic image may preferably be found within the beam defined by such a regulation (depending upon the regulation which is intended to be complied with), but may also be found in another embodiment outside such a beam. However, the source-related 3D holographic image is preferably within the beam, as specified for the specific lamp (vide infra) and preferably also projected close to the reflector opening (i.e. within 5 m). In this way, at the same time (and in substantially the same position), other road users will see both the signaling light and its accompanying source-related 3D holographic image according to the invention.

According to yet another aspect, the invention provides the use of a 3D hologram (i.e. the source-related hologram) for adding a holographic 3D image (i.e. the source-related 3D holographic image) to a beam of light of a car lighting unit during its operation. Advantageously, the invention provides such use while maintaining the required specification for the beam of light. In one embodiment, this may especially be the case when the ratio between the reflector surface area and the optical opening area is ≧1, particularly ≧5, more particularly ≧10, such as in the range of 5 to 100.

In a further embodiment, the invention provides the use of the source-related 3D hologram for generating the source-related holographic 3D image within a distance in the range of about 0 to 5 m from the reflector opening, and/or the use of the source-unrelated 3D hologram for generating the source-unrelated holographic 3D image within a distance in the range of about 0 to 5 m from the reflector opening.

While fulfilling the required beam specs for the lamp (lighting unit), a (source-related) 3D holographic image is advantageously generated by the lamp (lighting unit), additionally to the beam. This (source-related) 3D holographic image may contain any information desired, such as a logo, a brand name, a figure, etc. Furthermore, the information content may change with time and/or may be determined by one or more of the drivers (or crew), optional passengers and optional sensors (dynamic hologram).

According to yet another aspect, the invention provides the use of a source-unrelated 3D hologram comprised by a lighting unit for generating a holographic 3D image (i.e. the source-related 3D holographic image) in the absence of operation of the car lighting unit.

BRIEF DESCRIPTION OF THE DRAWINGS

Embodiments of the invention will now be described, by way of example only, with reference to the accompanying schematic drawings in which corresponding reference symbols indicate corresponding parts.

DESCRIPTION OF EMBODIMENTS

Figure 1:
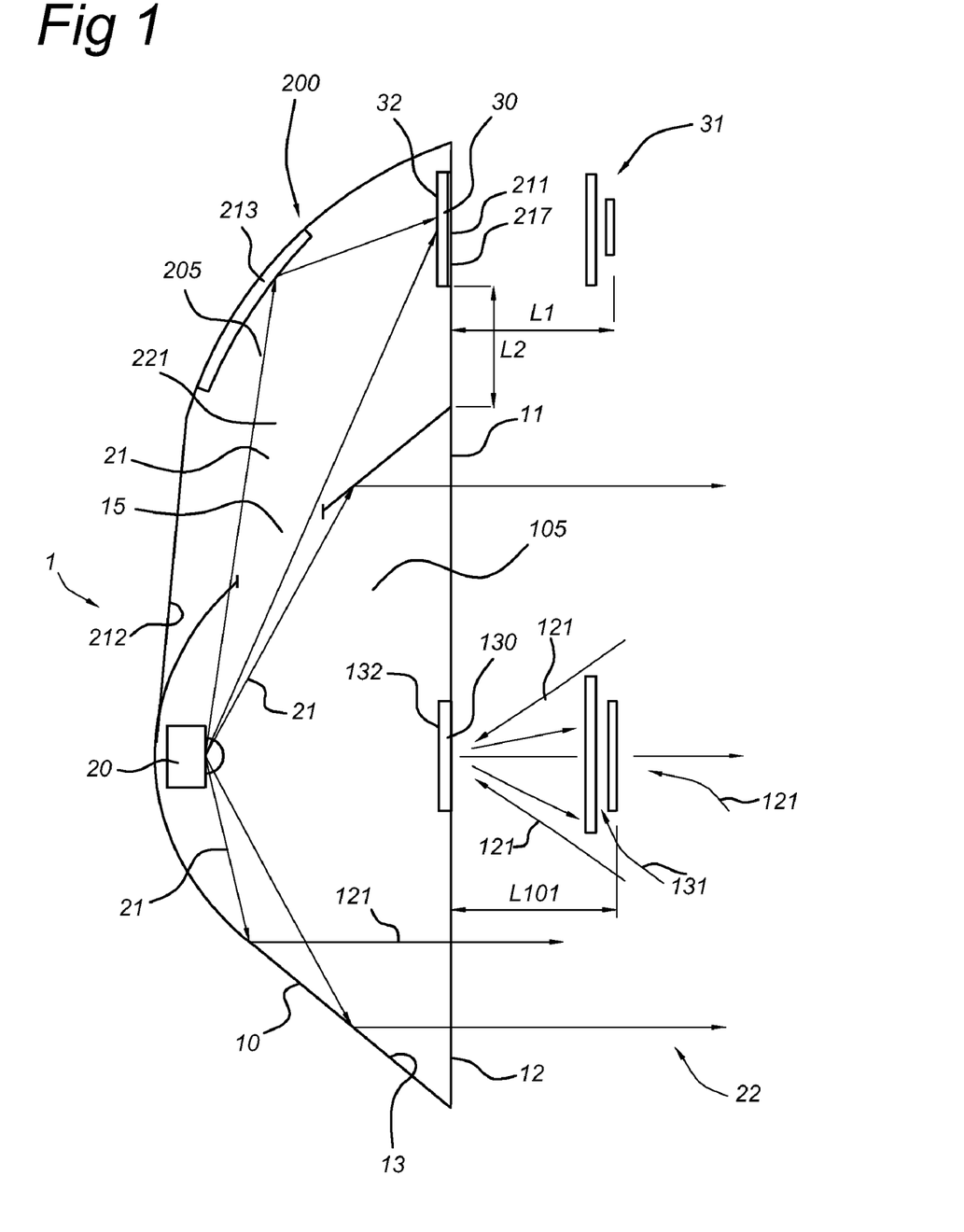
FIG. 1 schematically shows, in a side view, an embodiment of the lighting unit according to the invention.

FIG. 1 schematically shows, in a side view, a car lighting unit or device 1 according to the invention. For the sake of clarity, peripheral equipment such as a source, a lamp holder, connectors, ballasts, optional sensors, etc, is not included in the schematic drawing(s). The lighting unit 1 comprises a reflector 10 and a light source 20 arranged to generate light 21. During use of the lighting unit 1, light source 20 generates light and the lighting units provide a beam 22. As known in the art, the reflector 10 circumferentially surrounds the light source 20. In this schematically shown embodiment, the reflector is a tapered body with a reflector opening 11, and the reflector 10 is arranged to reflect at least part of the light 21 from the light source 20 through the reflector opening 11. For instance, the reflector 10 may also be used as a collimator. Reflectors of this type are known in the art. The reflector 10 is not necessarily centro-symmetrical, but may have any tapered form. Such reflector-lamp units are known in the art. For instance, the reflector may also have an elongated shape. The volume at least partially enclosed by the reflector 10 is herein indicated as a reflector chamber denoted by reference numeral 105.

As mentioned above, lighting units 1 not having a reflector can, in principle, be applied and, in one embodiment, are also enclosed herein. However, the lighting unit 1 according to the invention preferably comprises such a reflector 10. The presence of a reflector allows beam-shaping. Furthermore, the invention is also applicable to light guide collimators or other types of collimating optics. Such optics can be used to collimate the light to a reflector opening 11, and within the light guide, light is reflected in the direction of the reflector opening 11 (i.e. the end ("tip") of the light guide where light exits the light guide). In such embodiments, the source-unrelated hologram (see further below) may be arranged on the tip, or on optics in front of or attached to the tip, etc., as will be clear to the person skilled in the art.

The car lighting unit 1 further comprises a source-unrelated 3D hologram 130. As mentioned above, this may be any 3D hologram for generating any 3D holographic image, such as logos, brand names, information on, for instance, the distance to the next car behind the car having said lighting unit 1, etc. In this embodiment, the source-unrelated 3D hologram 130 is comprised by reflector opening 11. The source-unrelated 3D hologram is arranged to provide a source-unrelated 3D holographic image 131, for instance, at a distance L101 from reflector opening 11. Daylight, denoted by reference numeral 121, impinges on the source-unrelated 3D hologram 130, and the source-unrelated 3D holographic image 131 is thereby created, which is especially visible when the light source 20 is switched off, i.e. when the lighting unit 1 is not in operation. When the lighting unit 1 is in operation, the beam 22 may be relatively too strong to allow visibility of the source-unrelated 3D holographic image 131.

The car lighting unit in this embodiment further comprises a hologram unit 200, comprising an optical chamber 205. In the embodiments shown, this unit 200 and chamber 205 are external from the reflector 10 and external from the reflector chamber 105. In general, however, the two chambers will be adjacent, though distinct from each other. The reflector 10 further comprises an optical opening 15. The term optical opening 15 is used to indicate that at least part of the light 21 of light source 20 can escape from the reflector 10 through this optical opening 15, rather than through opening 11. The light 21 escaping from the light source 20 is used as feed light for a source-related hologram, which is denoted by reference numeral 30. The feed light is indicated as hologram feed light 221. In this embodiment, the optical opening 15 in reflector 10 is also the opening to hologram unit 200; i.e. to chamber 205. The optical opening 15 may be a physical opening, but may also comprise a waveguide, see below. The optical chamber 205 is arranged to receive the hologram feed light 221 via optical opening 15.

In this embodiment, the optical chamber 205 further comprises a reflector 213 arranged to reflect at least part of the hologram feed light 221 in the direction of the source-related 3D hologram 30. Here, in this embodiment, the reflector 213 may be arranged at least part of the wall (denoted by reference numeral 212) of the optical chamber 205. In this embodiment, the optical chamber 205 has a chamber opening 211 comprising the source-related hologram 30, which is thus a transmissive hologram in this embodiment. In general, a distance L2, between reflector opening 11 and chamber opening 211 is in the range of 1 to 800 mm, especially in the range of 2 to 500 mm.

The car lighting unit 1 is constructed to generate the beam of light 22 and a source-related holographic 3D image 31 by light 21 from the light source 20. Hence, unlike prior-art lamps, the 3D hologram is not applied to generate the beam 22, but is essentially used to generate the source-related 3D holographic image 31, said beam 22 being generated by light source 20 and reflector 10.

The terms "constructed", "assembled" and "designed" herein particularly refer to the lighting unit 1 which has a specific reflector 10 and a specific light source 20, which together provide a lighting unit 1 for use as a lamp in a vehicle, particularly a signaling lamp, preferably in accordance with at least one of the regulations mentioned herein (vide infra), the lamp being designed and constructed for its specific purpose.

The term "lighting unit" can also be understood to mean lamp. In some embodiments, the light source and reflector may be a single unit. In other embodiments, the light source 20 and reflector 10 may be easily detachable, for instance, because the light source 20 and reflector 10 are held together by movable physical attachment means such as screws and screwthread or a (movable) catch, as known to the person skilled in the art. As a unit, the lighting unit 1 may be integrated in a car and be commercially available as such. The light source 20 may (also) be a replaceable light source.

The term "car" herein particularly refers to automobiles, but in one embodiment may also refer to a vehicle selected from the group consisting of automobiles, vans, trucks (lorries), and buses. In an embodiment, it also includes their trailers. In yet another embodiment, the term "car" may also refer to a vehicle selected from the group consisting of automobiles, vans, motor caravans, trucks (lorries), buses, trailers, mobile homes, etc. However, in an embodiment, the term "car" may also refer to any other motor vehicle that is allowed on public roads, such as tractors, motor tikes, quads, motor skelters, etc. However, the lighting unit 1 according to the invention may also be applied in motorbikes (motor cycles), mopeds, trains, planes, and even ships, vessels, boats, etc. Hence, in an embodiment, the term "car" may also be interpreted as vehicle.

The car lighting unit is preferably designed to provide a signaling function, i.e. to emit a light signal to other road users (temporarily or permanently). This means that the light source 10 and the reflector 20, i.e. the lighting unit 1, and optionally other components, are chosen and assembled to provide, during use in a car, a signaling function (at least temporarily, such as during direction indicating, reversing or stopping).

The car lighting unit 1 according to the invention may be selected from the group consisting of rear direction indicator lamps, front direction indicator lamps, side direction indicator lamps (side turn signal lamps), stop lamps, front position (side) lamps, rear position (side) lamps (tail lamps), end-outline marker lamps, rear fog lamps (fog tail lamps), CHMSL (Center High Mounted Stop Lamps), HMSL (High Mounted Stop Lamps (rear turn lamps)), DRL (Daytime Running lights), reversing lamps (backup lamps), and parking lamps, and is particularly selected from the group consisting of stop lamps, indicator lamps (such as rear, front and side direction indicator lamps), rear fog lamps, high mounted stop lamps (CHMSL and HMSL) and daytime running lights.

In accordance with ECE Regulation 48: "direction indicator lamp" is herein understood to mean a lamp used to indicate to other road users that the driver intends to change direction to the right or to the left; a "stop lamp" is understood to mean a lamp used to indicate to other road users to the rear of the vehicle that the longitudinal movement of the vehicle is intentionally retarded; a "front position lamp" is understood to mean a lamp used to indicate the presence and the width of the vehicle when viewed from the front; a "rear position lamp" is understood to mean a lamp used to indicate the presence and width of the vehicle when viewed from the rear; "hazard warning signal" is understood to mean the simultaneous operation of all of a vehicle's direction indicator lamps to show that the vehicle temporarily constitutes a special danger to other road users; "rear fog lamp" is understood to mean a lamp used to make the vehicle more easily visible from the rear in dense fog; "reversing lamp" is understood to mean a lamp used to illuminate the road to the rear of the vehicle and warn other road users that the vehicle is reversing or about to reverse; "parking lamp" is understood to mean a lamp which is used to draw attention to the presence of a stationary vehicle in a built-up area. In such circumstances, it replaces the front and rear position lamps; "end-outline marker lamp" is understood to mean a lamp fitted near the extreme outer edge and as close as possible to the top of the vehicle and intended to indicate clearly the vehicle's overall width. For certain vehicles and trailers, this lamp is intended to complement the vehicle's front and rear position lamps by drawing particular attention to its bulk; "side marker lamp" is understood to mean a lamp used to indicate the presence of the vehicle when viewed from the side; and "daytime running lamp" is understood to mean a lamp facing in a forward direction used to make the vehicle more easily visible when driving during the daytime.

Such lighting units preferably fulfill the beam requirements for lamps as found in, for instance, SAE J 186, SAE J 585, SAE J 586, SAE J 588, SAE J 593, SAE J 599, SAE J 914, SAE J 1319, SAE J 1957 and SAE J 2087 for native America (i.e. USA and Canada), in ECE regulations 6, 7, 23, 38, 48, 77 and 87 for Europe and in JIS D 5500 for Japan, which are herein incorporated by reference; see also Table 1.

The ECE regulations are part of the "Agreement concerning the adoption of uniform technical prescriptions for wheeled vehicles, equipment and parts which can be fitted and/or be used on wheeled vehicles and the conditions for reciprocal recognition of approvals granted on the basis of these prescriptions" (including corrigendums, amendments and addendums to these ECE Regulations) of the United Nations Economic Commission for Europe (UNECE), also known as E/ECE/324 E/ECE/TRANS/505, which are known to the person skilled in the art and can be found at http://www.unece.org/. These regulations (including corrigendums, amendments and addendums to these ECE Regulations) are herein incorporated by reference. The lighting unit of the invention preferably fulfils the requirements (specifications) for at least one type of lamp described in the above-mentioned requirements.

The term "light source 20" herein also indicates "at least one light source 20". Hence, the terms "at least one light source 20" or "light source 20" refer to one or more light sources 20. For the sake of simplicity, the drawings herein only show one light source 20. The light source 20 may comprise one or more light sources selected from the group consisting of LEDs, filament light sources such as incandescent lamps and halogen lamps, and gas-discharge light sources such as high-intensity discharge lamps. The reflector 10 preferably contains or circumferentially surrounds only one light source 20, i.e. one single lamp or one single LED.

The term "light" herein particularly refers to visible radiation (VIS), i.e. radiation in the range of about 380 to 780 nm. When the light source 20 comprises more than one light source 20, such as a plurality of LEDs, the respective light sources 20 may generate radiation of different colors. For instance, a set of blue, green and red LEDs may be used as light source 20, but also a plurality of monochromatic light sources 20 may be used, such as an array of (red light-emitting) LEDs.

The terms "hologram" and "holographic image" are known in the art and refer to the intermediate photograph (or photographic record) that contains information for reproducing a three-dimensional image (representation) and the image (representation) itself. The term "hologram" and "holographic image" may also refer to a plurality of holograms and holographic images. The term "3D hologram", herein also indicated as "hologram" for brevity, refers to holograms that are designed to generate 3D images (indicated as "image" for brevity). The "3D holographic image" is herein also indicated as "holographic image" or "image".

As can be seen in FIG. 1, the light source 20 generates light 21, which may at least partly be reflected on a reflecting surface 13 of reflector 10. The light source 20 and the reflector 10 allow the lighting unit 1 to generate the beam of light 22 from light 21 originating from the light source 20. In addition, due to the presence of 3D hologram 30, part of the light 21 from the light source 20 is used to generate the 3D holographic image 31. By way of example, a few rings are schematically depicted as 3D holographic image 31 (vide infra).

The reflector opening 11 has a reflector opening area 12, and the source-unrelated 3D hologram 130 has a hologram surface area 132. In a preferred embodiment, the ratio between the reflector opening area 12 and the hologram surface area 132 is ≧1. Especially under this condition, the lighting unit 1 is suitable for generating the specified beam of light 22 and simultaneously the source-unrelated holographic 3D image 131. The ratio between the reflector opening area 12 and the hologram surface area 132 of source-unrelated hologram 130 is preferably in the range of about 2 to 20, more preferably in the range of about 2 to 10, even more preferably in the range of about 4 to 10.

In a preferred embodiment, during use of the lighting unit 1, the ratio of the luminous intensity related to the source-related holographic 3D image 31 relative to the total luminous intensity is in the range of about 0.002 to 0.3, more preferably in the range of about 0.01 to 0.1. Hence, in a preferred embodiment, the lighting unit is designed and constructed to generate, during use, light whose ratio of the luminous intensity related to the source-related holographic 3D image 31 relative to the total luminous intensity is in the range of about 0.002 to 0.3, more preferably in the range of about 0.01 to 0.1. In a specific embodiment, at least 5% of the total luminous flux of the light generated by the light source 20 is used by source-related hologram 30 so as to create a source-related holographic image 31 during use of the lighting unit 1. The source-related holographic image 31 preferably has a luminous intensity of about 0.04 to 100 cd. Furthermore, specific preferred embodiments are indicated in Table 1. As mentioned above, the lighting unit 1 preferably fulfils the requirements of at least one type of lamp whose specifications are laid down in one or more of the above-mentioned regulations. Hence, the whole lighting unit 1, i.e. the arrangement of light source 20 and reflector 10, is preferably in conformity with at least one of the regulation specifications; and the lighting unit 1 preferably produces, during use, a beam including a source-related 3D holographic image, whose luminous intensities and angular distributions are in accordance with the specifications laid down in one or more of the regulations mentioned herein.

In an embodiment, the ratio between the reflector surface area (i.e. the surface area of reflective surface 13 of reflector 10) and the optical opening area is ≧1, particularly ≧5, more particularly ≧10, such as in the range of 5 to 100. In this way, the light 21 of the light source 20 is substantially used to generate beam 22, and only part of the light escapes via the optical opening 15 as hologram feed light 221.

FIG. 1 schematically shows beam 22, which is the beam generated by the light source 20 and is shaped, at least partially, by reflector 10 with reflective surface 13, and hologram 31 within a distance L1. In a preferred embodiment, the car lighting unit 1 is constructed to generate the source-related holographic 3D image 31 within a distance L1 in the range of about 0 to 5 m, preferably about 0 to 0.5 m, more preferably in the range of about 0 to 0.1 m from the reflector opening 11. Here, the distance L1 is the shortest distance from the opening 11 of the reflector 10 to a part of the source-related holographic image 31 that is furthest away from source 20 or reflector opening 11.

FIGS. 2a-2e show a non-limiting number of possible embodiments of the lighting unit 1 according to the invention. Note that each embodiment shows different variations, which may also be combined; the claims are not confined to the schematically depicted variants and embodiments.

Figure 2A:
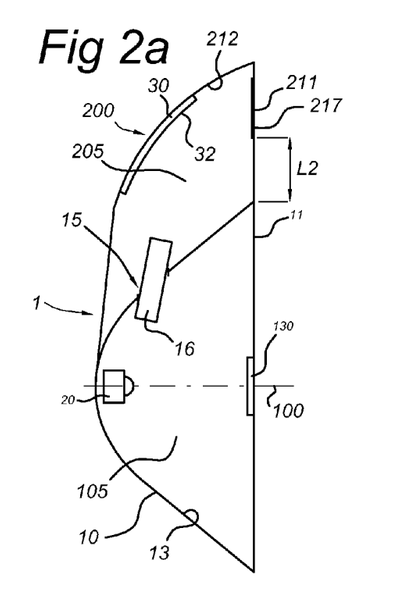
FIGS. 2a-e schematically show, in a side view, some embodiments of the lighting unit according to the invention.

For instance, similarly as in FIG. 1, FIG. 2a shows a reflective source-unrelated hologram 130, which is aligned "on axis". FIGS. 2a-2e show an axis 100, which, in circularly symmetric reflectors 11, is a longitudinal axis. It particularly refers to the reference axes or 0°, 0° axes as used in the above-mentioned regulations, see, for instance, ECE Regulation No 6, page 18, Figure and pages 32 and 33 (direction indicator); ECE Regulation No. 7, page 22, Figure (front position (side) lamp and rear position (side) lamp reference axes), pages 23 and 37, Figures (stop lamps), and ECE Regulation 48.

In FIG. 2a, the optical opening 15 comprises a waveguide 16. The hologram feed light 221 is guided to the source-related hologram 30. In this embodiment, the source-related hologram 30 is a reflective hologram, arranged at least part of the wall 212 (i.e. internal wall) of the optical chamber 205. The optical chamber 205 further comprises chamber opening 211, through which the holographic image can be projected.

Figure 2B:
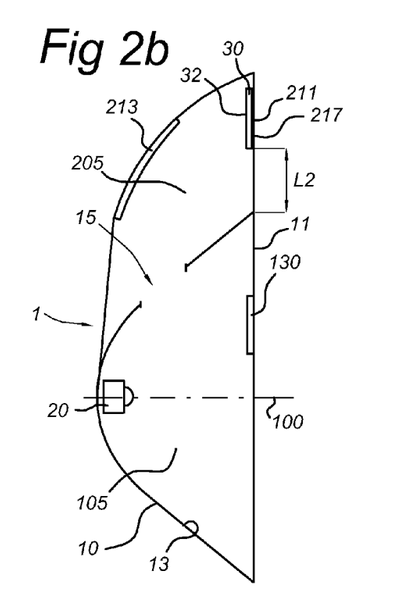

In FIG. 2b, the source-unrelated hologram 130 is off-axis. In this embodiment, the optical opening 15 is a physical opening in reflector wall 13, allowing part of the light 21 to escape from the reflector 10 (i.e. from reflector chamber 105) and to be used as hologram feed light 221. In this embodiment, also an optical chamber 205 is applied. Such an optical chamber 205 comprises source-related hologram 30 and two openings, i.e. an opening for receiving light from the optical opening 15 (in these embodiments, the optical opening 15 of the reflector 10 is also the opening of the optical chamber 205), and chamber opening 211, which allows the source-related holographic image 30 to be projected to the exterior of the car lighting unit 1.

The source-related hologram 30 may be comprised by chamber opening 211, and may be arranged at an upstream side of a transparent window 217 comprised by chamber opening 211, or at a downstream side of such a transparent window 217 comprised by chamber opening 211, or it may be integrated in such a transparent window 217. In FIGS. 1, 2b and 2d, the chamber opening 211 may comprise the transparent window 217. In other schematically shown embodiments, also a transparent window may be applied. The transparent window 217 may also comprise a lens or another optical element.

In the embodiment schematically shown in FIG. 2b, a reflector 213 is applied, which is arranged to receive light from the light source 20 and to reflect light 221 in the direction of the source-related hologram 30, which in this embodiment is comprised by chamber opening 211 (see also above).

Figure 2C:
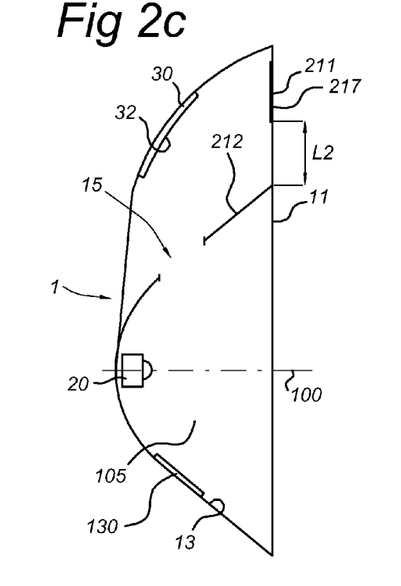
Figure 2D:
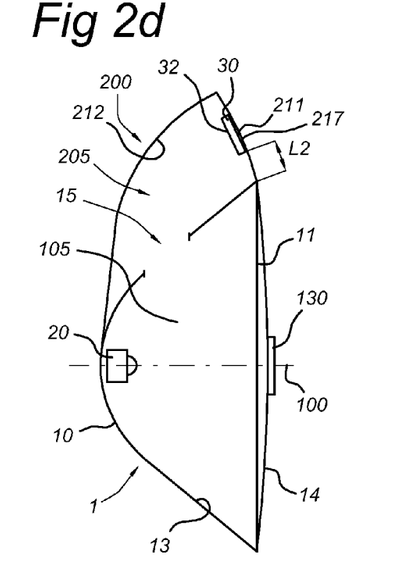

In FIG. 2c, the source-unrelated hologram 130 is arranged on the reflecting surface 13 of reflector 10. In this case, the source-unrelated hologram 130 may particularly be reflective. Hence, in an embodiment, the reflector 10 has reflector surface 13, and the source-unrelated 3D hologram 130 is arranged on the reflector surface 13, which source-unrelated 3D hologram 130 is preferably reflective.

In the embodiment shown in FIG. 2c, the source-related hologram 30 is arranged at least part of the wall 212 of optical chamber 205.

Consequently, the source-related 3D hologram 30 is a transmissive or a reflective hologram.

In yet another embodiment, schematically shown in FIG. 2d, reflector opening 11 comprises an optical element 14, such as a front glass or a lens (which lens may optionally also act as a front glass). In such an embodiment, the source-unrelated hologram 130 may be integrated with the optical element 14 (such as a front glass). For instance, source-unrelated hologram 130 may be attached to or imprinted on the surface (for instance, on the surface directed to the light source 20 (upstream side) or on the external surface of the optical element 14 (as shown in FIG. 2d) (downstream side), or it may be included in the optical element 14. Again, the hologram 130 may be off-axis or on-axis and is preferably transmissive.

The source-related hologram 30 may be arranged as described above and, in the embodiment shown, is arranged as being comprised by the chamber opening 211.

In an embodiment, the chamber opening 211 and reflector opening 11 comprise one single transparent window, i.e. optical element 14 and transparent window 217 may be one integral transparent window.

Figures 2E, 3A:
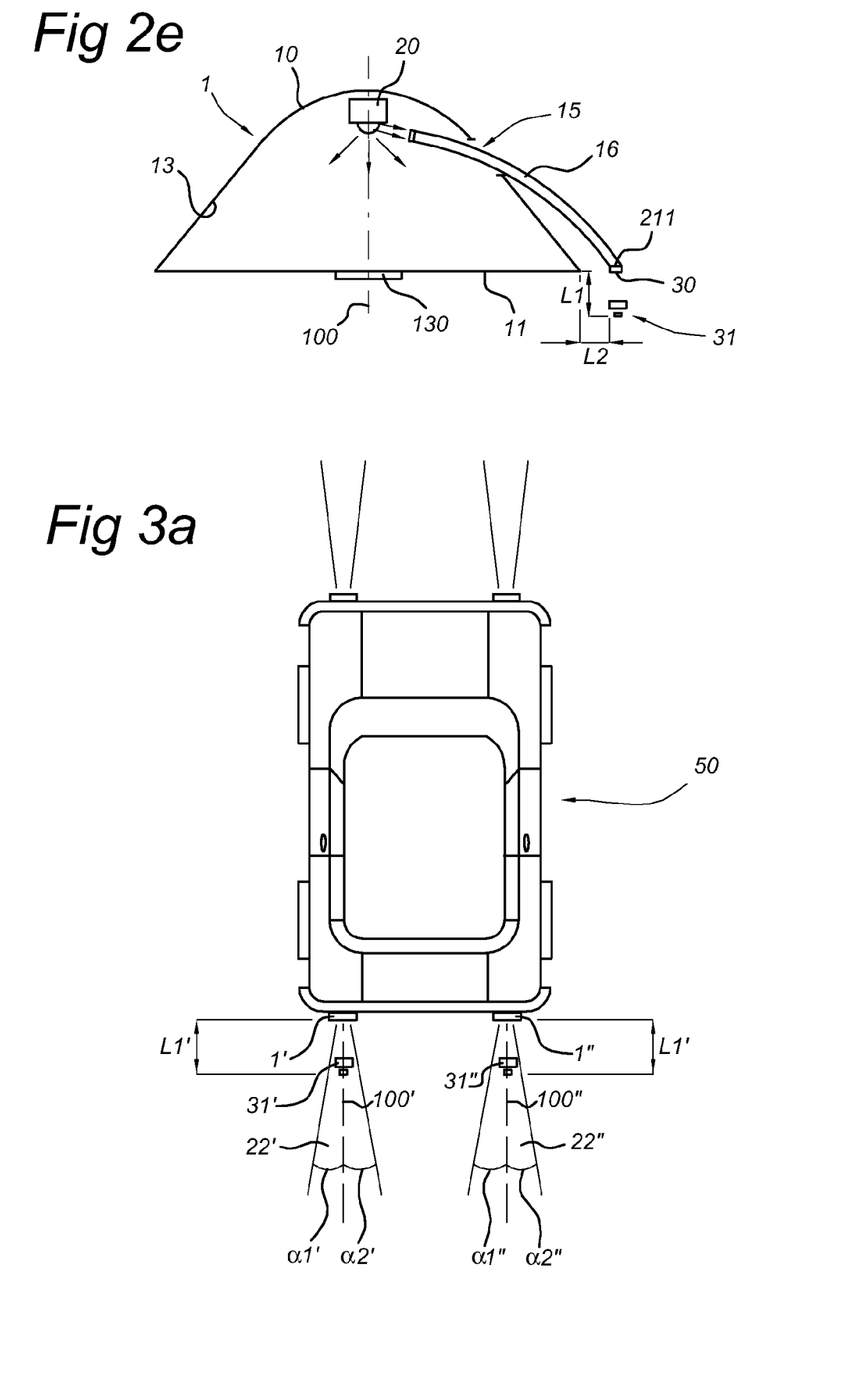
FIGS. 3a-c schematically show embodiments of the lighting units according to the invention, for instance, as rear stop lights.

FIG. 2e shows an embodiment in which no optical chamber is applied, but in which at least part of the light 21, i.e. the hologram feed light 211, is drawn off via waveguide 16, which is comprised by optical opening 15. The waveguide 16 guides the hologram feed light 211 to the source-related hologram 30, which may be arranged, for instance, at the tip of waveguide 16, i.e. the waveguide may be considered as "optical chamber" and the tip may be considered as the opening of such a chamber. Hence, the tip (waveguide downstream side) is here also indicated as chamber opening 211.

Note that in all embodiments (shown here), light source 20 may substantially emit light in the direction of the reflector opening 11, but may also emit light substantially indirectly (not shown), i.e. light source 20 substantially emits light in the direction of the reflector 10. For instance, referring to FIGS. 1 and 2, the light source 20 is schematically shown as a LED. In these Figures, the light source 20 substantially emits light in the direction of reflector opening 11. However, in an alternative embodiment, the emitting surface of the LED may also be directed in the direction of the reflector 10, for instance, the light source 20 may have no direct emission of light to the reflector opening 11, but instead all emission of light from the light source is incident on the reflecting surface 13, which substantially reflects the light in the direction of the reflector opening 11. In an embodiment, light source 20 is arranged to emit light substantially in the direction of the taper of the reflector 10. Hence, in an embodiment, the reflector opening 11 comprises transmissive optical element 14, and the source-unrelated 3D hologram 130 is arranged on the transmissive optical element 14 (as schematically shown) or in this element.

According to a further aspect of the invention, the invention provides the use of a source-related 3D hologram 30 for adding a holographic 3D image 31 to a beam of light 22 of a car lighting unit 1 during its operation. This may be done without deviating from the required specification for the beam of light 22. The term "during operation" herein refers to the lighting unit 1 in use.

In a specific embodiment, the invention provides an embodiment of the car lighting unit 1 wherein the source-related 3D hologram 30 is a dynamic hologram. In this way, logos, information, figures, etc. may be displayed as a function of one or more parameters selected from the group consisting of time, the input of one or more of the drivers, the crew and optional passengers, a sensor signal, such as the distance between the car having such a lighting unit and another car behind or in front of the car having said lighting unit 1, etc. Hence, the source-related holographic image 31 may be generated during specific (predetermined) periods of time during operation of the lighting unit 1. Likewise, the source-unrelated 3D hologram may be a dynamic hologram.

Figure 3B:
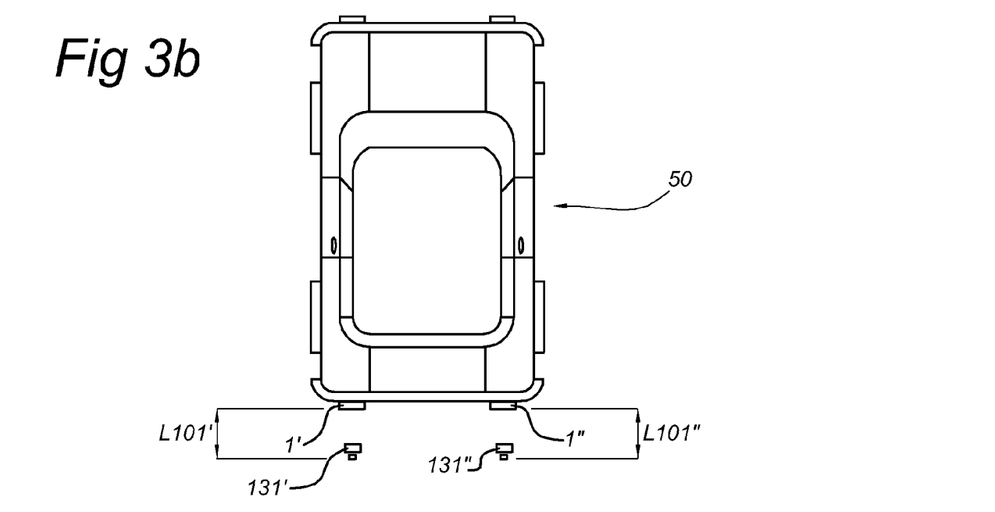
Figure 3C:
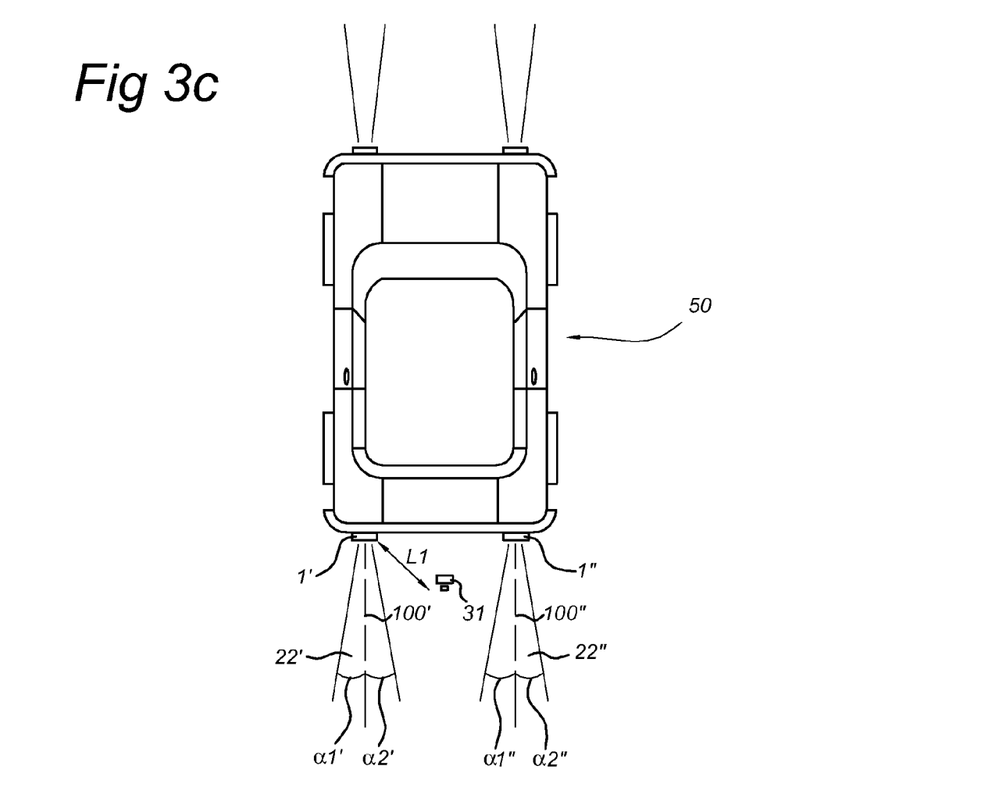

FIG. 3 is a schematic top view of an embodiment of a car 50 with lighting units 1' and 1" according to the invention. The lighting units 1' and 1" are arranged to provide beams 22' and 22", respectively. Lighting units 1'and 1" may be, for instance, rear stop lamps. In addition to these beams 22' and 22", the lighting units 1' and 1" in this schematic embodiment generate source-related holographic images 31' and 31", which, as can be seen in the Figure, are within the beam specs concerning angular distribution. The beams 22' and 22" are preferably defined by the required specification for these lamps, and are found within angles $\alpha 1'$, $\alpha 2'$ and $\alpha 1"$, $\alpha 2"$, respectively. The angles $\alpha 1'$, $\alpha 2'$, may differ; likewise, the angles $\alpha 1"$, $\alpha 2"$ may differ, see, for instance, also the Figures on pages 18-22 of ECE Regulation No. 6 and pages 33-38 of ECE Regulation No. 48 (direction indicators), page 23 of ECE Regulation No. 7 and pages 40-43 of ECE Regulation No. 48 (amongst others, stop lamps) and other Figures and provisions in the regulations such as ECE Regulation No. 48. Hence, in addition to the prescribed beam of a direction indicator, rear light, etc., a source-related holographic image 31 may be added during use of the lighting unit 1. The car lighting unit 1 is preferably constructed to generate the source-related holographic images 31' and 31" within the beam of light 22, but in another embodiment (schematically shown in FIG. 3c), the source-related holographic image 31 may be outside the beam of light 22. Beyond angles $\alpha 1'$, $\alpha 2'$, $\alpha 1"$, $\alpha 2"$, i.e. outside the beams 22' and 22", the respective light sources have a luminous intensity which is preferably equal to or less than about 0.1 times the maximum luminous intensity, as known to the person skilled in the art. Since, in a preferred embodiment, the source-related holographic image 31 is within the beam 22, such as source-related holographic 3D image 31' in beam 22' and source-related holographic 3D image 31" in beam 22", the beam or beams including the source-related holographic 3D image or images comply with the specifications as defined in at least one of the regulations mentioned herein, while nevertheless a holographic image has been added to the beam.

In the schematically shown situation, the source-related holographic images are projected within distances L'1 and L"1, respectively.

FIG. 3b schematically shows a situation in which the car 50 has its lights switched off, at least the lighting units 1 according to the invention are switched off. Due to daylight, still holographic images might be projected, as indicated by the source-unrelated holographic images 131' and 131", respectively. In the schematically shown embodiment, the images are projected right behind the lighting units 1, respectively, but, as mentioned above, they may also be projected elsewhere, within or outside the beam specifications for the lighting units. Here, the source-unrelated holographic images 131' and 131" are projected within distances L'101 and L"101, respectively.

FIG. 3c schematically shows an embodiment in which the lighting units 1' and/or 1" are arranged to provide the source-related holographic image or images, here again denoted by reference numeral 30, outside the beam specifications.

Figure 4:
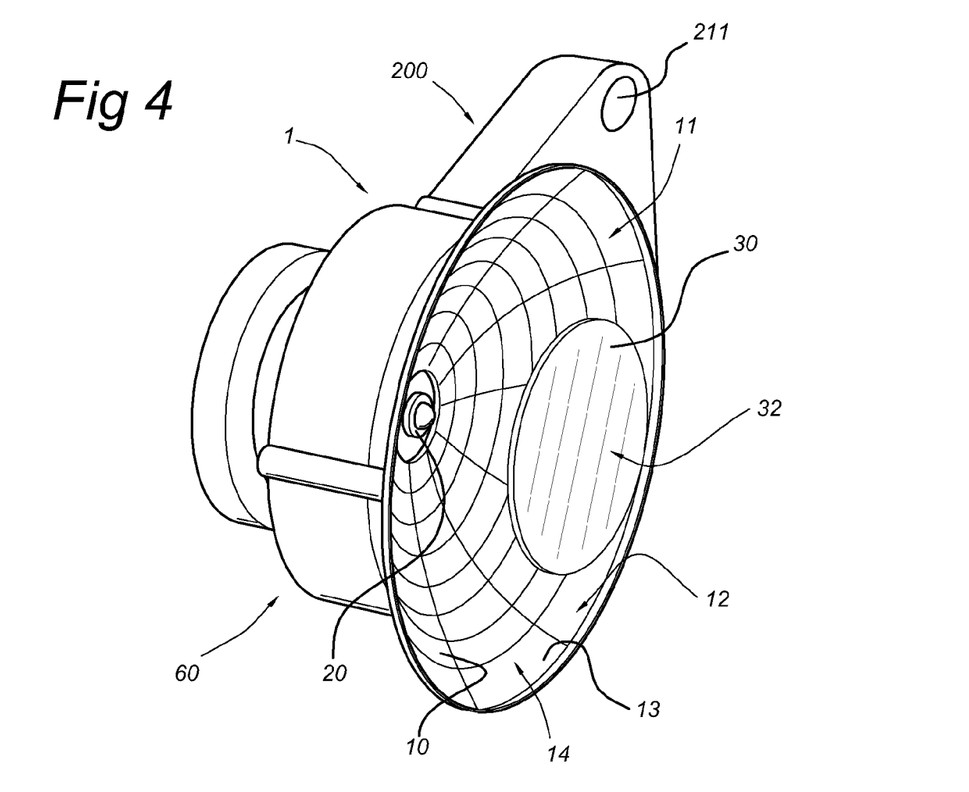
FIG. 4 schematically shows an embodiment of the lighting unit according to the invention in a perspective view.
Figure 5:
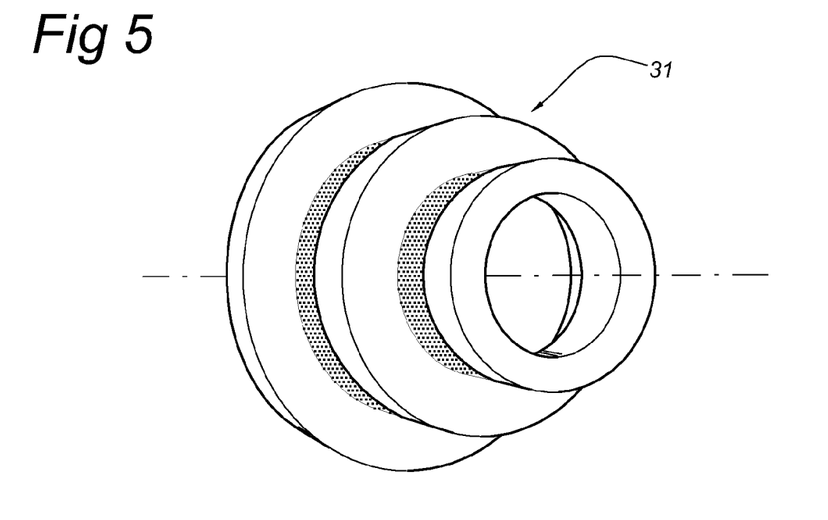
FIG. 5 schematically shows an example of a 3D holographic image generated by means of an embodiment of the lamp according to the invention (for the sake of clarity, the beam is not shown).

FIG. 4 schematically shows an embodiment of the lighting unit 1 according to the invention in a perspective view. It shows the lighting unit 1 having a housing 60 for accommodating a reflector 10 with a reflecting surface 13. The reflector 10 has a reflector opening 11 with a reflector opening area 12. The opening 11 comprises an optical element 14, which is here, by way of example, a front glass. Attached to the optical element 14 is source-unrelated hologram 130, having a hologram area 132. Furthermore, the lighting unit 1 comprises a hologram unit 200 (here attached to the reflector 10 or reflector housing), with chamber opening 211, which unit comprises the source-related hologram 30 (not shown). By way of example, FIG. 5 shows an example of the source-related 3D holographic image 31 that can be generated.

The lighting unit 1 may further comprise a controller (not shown) for controlling the contents of the source-related holographic image 30 and/or the source-unrelated holographic image 130, particularly when a source-related dynamic hologram 30 and/or a source-unrelated dynamic hologram 130 is applied, respectively. The controller may be an "only hardware" system with, for instance, switches such as touch controls, slide switches, etc. to control the desired contents of the 3D holographic image and optionally its display time and/or display frequency, depending upon the user's wishes (driver and/or any optional passenger or passengers). Furthermore, the contents may optionally be dependent upon external parameters such as time, temperature, speed, traffic density, distance to the next car in front of the lighting unit 1 (particularly in the case of a lighting unit constructed as front light), or the next car beside the lighting unit (particularly in the case of a lighting unit constructed as side light), or the next car behind the lighting unit (particularly in the case of a lighting unit constructed as rear light), which may be measured by sensors (not shown). The controller may be operated via a remote control. In yet another embodiment, the controller may comprise a memory, with executable instructions, an input-output unit, configured to (i) receive one or more input signals from one or more devices selected from the group consisting of (1) one or more sensors and (2) a user input device and (ii) send one or more output signals to control the contents of the source-related 3D holographic image 31 and/or the source-unrelated dynamic holographic image 131; and a processor designed to process the one or more input signals into one or more output signals based on the executable instructions.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

TABLE 1

Overview of lighting units 1 (lamps) for cars (and their trailers) according to embodiments of the invention, including regulations

| Type of lamp | Regulation (EU) | Regulation (NA) | Regulation (Japan) | embodiment preferred luminous intensity range for holographic image 31 (cd) |
|---|---|---|---|---|
| rear direction indicator lamps | ECE regulation 6 (cat 2a, 2b) | SAE J 588 | JIS D 5500 | 0.8-35 |
| front direction indicator lamps | ECE regulation 6 (cat 1, 1a, 1b) | SAE J 588 | JIS D 5500 | 3.5-80 |
| side direction indicator lamps (side turn signal lamps) | ECE regulation 6 (cat 5) | SAE J 914 | JIS D 5500 | |
| stop lamps | ECE regulation 7 (S1, S2) | SAE J 586 | JIS D 5500 | 1.2-26 |
| front position (side) lamps | ECE regulation 7 | SAE J 586 | JIS D 5500 | |
| rear position (side) lamps (tail lamps) | ECE regulation 7 | SAE J 585 | JIS D 5500 | 0.04-0.8 |
| end-outline marker lamps | ECE regulation 7 | | | |
| rear fog lamps (fog tail lamps) | ECE regulation 38 | SAE J 1319 | | 1.6-30 |
| parking lamps | ECE regulation 77 | | | |
| CHMSL | ECE regulation 7 (S3) | SAE J 1957 | JIS D 5500 | 0.5-5 |
| HMSL (rear turn lamps) | | SAE J 186, 588 | | 4-40 |
| DRL (daytime running lights) | ECE regulation 87 | SAE J 2087, 593 | | 8-100 |
| reversing lamps (backup lamps) | ECE regulation 23 | SAE J 593 | JIS D 5500 Grade B1 | 1.6-16 |

The invention claimed is:

1. A car lighting unit comprising:
   a reflector,
   a light source arranged to generate light, wherein the reflector circumferentially surrounds the light source and has a reflector opening, the reflector being arranged to reflect at least part of the light from the light source through the reflector opening,
   a daylight 3D hologram arranged to receive daylight and generate a source-unrelated holographic 3D image by daylight, wherein the source-unrelated 3D hologram is a reflective 3D hologram comprised by the reflector, the reflector further comprising an optical opening arranged to guide away, as hologram feed light, at least part of the light from the light source,
   a source-related 3D hologram, external from the reflector and arranged to receive the hologram feed light via the optical opening and generate a source-related holographic 3D image, said car lighting unit being constructed to generate a beam of light and the source-related holographic 3D image by light from the light source; and
   an optical unit defining an optical chamber arranged to receive the hologram feed light via optical opening, the optical chamber further comprising a reflector arranged to reflect at least part of the hologram feed light in the direction of the source-related 3D hologram.

2. The car lighting unit according to claim 1, wherein the reflector opening has a reflector opening area, the daylight 3D hologram has a hologram surface area, and the ratio between the reflector opening area and the hologram surface area is $\geq 1$.

3. The car lighting unit according to claim 1, wherein the car lighting unit is selected from the group consisting of: rear direction indicator lamps, front direction indicator lamps, side direction indicator lamps, stop lamps, front position (side) lamps, rear position (side) lamps, end-outline marker lamps, rear fog lamps, center high mounted stop lamps, high mounted stop lamps, daytime running lights, reversing lamps and parking lamps.

4. The car lighting unit according to claim 1, wherein the car lighting unit is constructed to generate the daylight holographic 3D image within a distance in the range of 0 to 0.1 m from the reflector opening, and/or wherein the car lighting unit is constructed to generate the source-related holographic 3D image within a distance L1 in the range of 0 to 0.1 m from the reflector opening.

5. The car lighting unit according to claim 1, wherein, during use, the ratio of the luminous intensity related to the source-related holographic 3D image relative to the total luminous intensity is in the range of 0.01 to 0.1.

6. The car lighting unit according to claim 1, wherein, during use, the luminous intensity related to the source-related holographic 3D image is in the range of 0.04 to 100 cd.

7. The car lighting unit according to claim 1, wherein the optical opening comprises a waveguide arranged to guide the hologram feed light in the direction of the source-related 3D hologram.

8. The car lighting unit according to claim 1, wherein the car lighting unit further comprises an optical unit (200) with an optical chamber, the optical chamber being arranged to receive the hologram feed light via the optical opening, wherein the optical chamber further comprises a chamber opening (211), the source-related 3D hologram is a transmissive hologram, and the chamber opening (211) comprises the source-related 3D hologram.

9. The car lighting unit according to claim 1, wherein the source-related 3D hologram is a reflective hologram.

10. The car lighting unit according to claim 1, wherein the reflector has a reflector surface, and wherein the daylight 3D hologram is arranged on the reflector surface.

11. The car lighting unit according to claim 1, wherein the reflector opening comprises a transmissive optical element, and wherein the daylight 3D hologram is integrated with the transmissive optical element.

12. The car lighting unit according to claim 1, wherein the daylight 3D hologram is a dynamic hologram, and/or wherein the source-related hologram is a dynamic hologram.

* * * * *